(12) United States Patent
Abadie et al.

(10) Patent No.: US 10,333,634 B1
(45) Date of Patent: Jun. 25, 2019

(54) TEST ARRANGEMENT AND TEST METHOD

(71) Applicant: Rohde & Schwarz GmbH & Co. KG, München (DE)

(72) Inventors: Vincent Abadie, Höhenschäftlarn (DE); Corbett Rowell, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/949,278

(22) Filed: Apr. 10, 2018

(51) Int. Cl.
*H04B 17/00* (2015.01)
*H04B 17/29* (2015.01)

(52) U.S. Cl.
CPC .................... *H04B 17/29* (2015.01)

(58) Field of Classification Search
CPC .... H04B 17/29; H04B 17/0085; H04B 10/07; H04B 17/15; H04B 17/16; H04W 24/00
See application file for complete search history.

(56) References Cited

U.S. PATENT DOCUMENTS

| 2011/0187504 A1* | 8/2011 | Sadok | H01Q 1/28 340/10.1 |
| 2014/0087668 A1* | 3/2014 | Mow | H04B 17/318 455/67.14 |
| 2015/0131493 A1* | 5/2015 | Navalekar | H04L 5/14 370/278 |

* cited by examiner

*Primary Examiner* — Sonny Trinh
(74) *Attorney, Agent, or Firm* — Westman, Champlin & Koehler, P.A.

(57) ABSTRACT

Test arrangement and method for wirelessly testing a device under test. An in-band test signal and a further interference signal are emitted to the device under test by a test arrangement comprising a single antenna. For this purpose, a linear polarized in-band test signal and a linear polarized interference signal are generated. The in-band test signal and the interference signal are combined by a transducer to a circular polarized signal and the circular polarized signal comprising the in-band test signal and interference signal is used for testing the device under test.

20 Claims, 3 Drawing Sheets

TEST ARRANGEMENT AND TEST METHOD

TECHNICAL FIELD

The present invention relates to a test arrangement. The present invention further relates to a test method.

BACKGROUND

Although applicable in principal to any wireless test system, the present invention and its underlying problem will be hereinafter described in combination with testing of wireless communication devices.

The use of wireless communication systems for communication between electronic device increases continually with the advance of high-speed wireless data communications.

During development or production of devices for such communication systems it is necessary to thoroughly test the devices for compliance with communication standards and legal regulations, especially regarding wireless communication standards and legal regulations.

Usually the respective wireless communication standards and legal regulations will determine the circumstances under which a test must be performed.

For example, the tests of such devices require a testing of the devices in combination with further interference signals. For this purpose, the interference signals as well as the main signals have to be provided to the device under test, or signals emitted by the device under test have to be measured in an environment of interference signals.

Against this background, the problem addressed by the present invention is to provide a simple test equipment for wireless devices dealing with interference signals.

SUMMARY

The present invention solves this problem with a test arrangement with the features of claim 1 and by a test method with the features of claim 11.

According to a first aspect, a test arrangement for wirelessly testing a device under test is provided. The test arrangement comprises a signal generator, a transducer and an antenna. The signal generator is configured to generate a linear polarized in-band source signal. The signal generator is further configured to generate a linear polarized interference signal. The transducer is configured to receive the linear polarized in-band source signal and the linear polarized interference signal. The transducer is further configured to output a circular polarized test signal. The circular polarized test signal which is output by the transducer is based on a combination of the linear polarized in-band source signal and the linear polarized interference signal. The antenna is adapted to emit the circular polarized test signal to the device under test.

According to a second aspect, a test method for wirelessly testing a device under test is provided. The test method comprises the steps of generating a linear polarized in-band source signal by a signal generator, and generating a linear polarized interference signal by the signal generator. The method further comprises combining the linear polarized in-band source signal and the linear polarized interference signal by a transducer to obtain a circular polarized test signal; and emitting the circular polarized test signal to the device under test by an antenna.

The present invention is based on the fact that testing a device under test may not only require emitting or receiving an in-band the signal but also testing an influence of an additional interference signal. Accordingly, such interference signals have to be generated and emitted to the device under test while performing a desired test sequence.

When performing tests employing such additional interference signals, the additional interference signals may be generated and emitted to the test scenario independently of the generation and/or reception of the in-band test signals. In this case, a huge amount of hardware for separately dealing with the interference signal is required which causes high costs and a complex test environment.

Thus, it is an idea of the present invention to provide an improved testing of wireless devices under test for testing the device under test under the influence of an additional interference signal. Therefore, the additional interference signal is added to the signal path between the device under test and the measurement equipment. Hence, the in-band test signal and the additional interference signal are provided to the device under test by a common test equipment, in particular by a same antenna of the test equipment. In this way, the test equipment can be simplified, which causes lower costs.

In particular, it is an idea of the present invention to generate both, the in-band test signal and the additional interference signal by separate, linear polarized radio frequency waves. In such a case, the linear polarized radio-frequency waves can be combined to a common circular polarized radio-frequency wave. Accordingly, the in-band test signal and the interference signal can be emitted by the antenna of the test arrangement to the device under test in common by a single radio-frequency wave.

The combination of the two separate linear polarized radio-frequency waves to a single radio-frequency wave can be performed, for instance, in a transducer. Such a transducer is a passive radio-frequency component which may receive two linear polarized radio-frequency waves. In particular, a first received radio frequency wave may be considered as a horizontal polarization, and a second received radio frequency wave may be considered as a vertical polarization. Accordingly, the two received radio-frequency waves can be combined to a single circular polarized radio-frequency wave based on the two received radio frequency waves representing the horizontal and vertical polarization component, respectively. Since the transducer is a passive radio-frequency component, no additional power or control signals are required. Moreover, the combination of the two linear polarized input signals to a single circular polarized output signal can be performed with minimal impact to the signal path.

The generation of the in-band signal and the generation of the interference signal can be performed, for example, by a signal generator comprising separate devices for generating the in-band signal and for generating interference signal. However, it is understood that any other configuration for generating the in-band signal and the interference signal is also possible. For example, the in-band signal and the interference signal may be also generated by only a single signal generating device.

The in-band signal and the interference signal may be provided to the transducer as linear polarized radio-frequency waves. For this purpose, the signal generator may be connected to the transducer by any appropriate way for forwarding the linear polarized radio-frequency waves form the signal generator to the transducer. As will be further described below, it may be possible to couple the output ports of the signal generator with the input ports of the transducer, for example, by means of waveguides or the like.

In order to provide linear polarized radio-frequency waves to the transducer, the signal generator may directly generate electromagnetic waves and provide the generated electromagnetic wave to the transducer. However, it may be also possible that the signal generator may convert a wired radio-frequency signal to linear polarized electromagnetic waves. For this purpose, the signal generator may further comprise appropriate devices for converting the wired radio-frequency signals to linear polarized radio-frequency wave.

The in-band signal may be any kind of appropriate radio frequency signal for testing the device under test. For example, the in-band signal may comprise a communication signal, a control signal or any other appropriate signal for testing the device under test. The in-band signal may be a signal of predetermined frequency, a predetermined frequency band, a signal relating to a number of one or more channels, or any other appropriate signal for testing the device under test. The in-band signal may comprise a modulated data sequence, a control sequence, a sequence of random data or any other appropriate kind of data for testing the device under test.

The interference signal may be any kind of appropriate radio frequency signal which may interfere with the in-bed signal and/or which may cause any kind of interference in the device under test. For example, the interference signal may relate to a frequency, frequency band or a number of one or more channels which correspond to the in-band signal. However, the interference signal may also relate to a frequency, frequency band or a number of one or more channels having predetermined relationship to the in-band the signal. For example the interference signal may relate to a neighboring frequency or channel with respect to the in-band signal.

In a possible embodiment, the properties of the interference signal such as frequency, modulation, amplitude or any other appropriate parameter may be derived from the in-band signal. Furthermore, it may be also possible to apply predetermined properties/parameters, in particular the parameters may be independent of the in-band signal.

The antenna may be any type of antenna that is adapted to emit and/or receive radio-frequency waves to/from the device under test. In particular, the antenna may be an antenna for emitting/receiving circular polarized electromagnetic waves.

The antenna may comprise a signal connector for connecting the antenna directly to the transducer. Alternatively, in additional device, for example an appropriate waveguide or the like may be used for coupling the antenna with the transducer.

Further embodiments of the present invention are subject of the further subclaims and of the following description, referring to the drawings.

In a possible embodiment, the transducer comprises an orthomode transducer. The orthomode transducer may comprise a first input port for receiving the linear polarized in-band source signal and a second input port for receiving the linear polarized interference signal. The orthomode transducer may further comprise an output port for providing the circular polarized test signal.

An orthomode transducer may be a passive radio-frequency device, in particular a waveguide component. An orthomode transducer may either combine or separate two orthogonally polarized microwave signal path. When combining two linear polarized microwave signals, the combined signal may be a circularly polarized microwave signal. Alternatively, a circularly polarized microwave signal may be separated in two separate linear polarized signals, wherein the polarization of the two signals may be orthogonal.

In a possible embodiment, the test arrangement may comprise a first rectangular waveguide for providing the linear polarized in-band source signal of the signal generator to the transducer, and a second rectangular waveguide for providing the interference signal of the signal generator to the transducer.

The dimension of the waveguides, in particular the cost section of the waveguide may be adapted to the frequency range of the respective signals, i.e. the in-band signal and the interference signal, respectively. In this way, the radio-frequency waves of the signal generator can be provided to the transducer. By using rectangular waveguide, the waveguide can be easily adapted to the linear polarization of the respective signals of the in-band signal and the interference signal.

In a possible embodiment, the signal generator comprises a first signal source for generating a predetermined in-band source signal.

The first signal source may be any source which is appropriate for generating a desired in-band signal. In particular, the desired in-band signal may be any kind of radio frequency signal for testing the device under test. The first signal source may comprise an output port for outputting the radio-frequency waves of the in-band signal. In particular, the output port may be a port for directly coupling an input port of the transducer to the respective output port or for connecting a waveguide, in particular a rectangular waveguide.

In a possible embodiment, the test signal generator comprises a second signal source for generating a predetermined interference signal.

The second signal source may generate the interference signal independent of the in-band the signal. Alternatively, it may be also possible that the interference signal may be generated with respect to the generated in-band signal. For example, the frequency frequency range, the phase, the amplitude, or any other parameter of the interference signal may be determined based on the properties of the in-band signal. For this purpose, the second signal source may be communicatively coupled with the first signal source. Alternatively, the second signal source may receive the in-band signal and generate or adapt the interference signal based on the received in-band signal.

The first signal source and/or the second signal source may be realized by analogue signal generating devices. Alternatively, the first signal source and/or the second signal source may be realized at least in part by a digital signal processor or the like.

In a possible embodiment the linear polarized interference signal is generated by an intermodulated interference signal based on a signal provided by the second signal source.

Intermodulated signals may be generated, for example, by an amplitude modulation of signals containing two or more different frequencies caused by nonlinearities in a system. However, it is understood, that any other scheme for generating interference signal based on a signal generated by the second signal source and/or the first signal source may be also possible.

In a possible embodiment, the antenna comprises a circularly polarized horn antenna.

By a circularly polarized horn antenna, it is possible to emit and/or receive circularly polarized electromagnetic waves. In this way, the combination of the in-band signal and the interference signal which is generated by the transducer can be emitted by such an antenna. Alternatively or additionally, a circularly polarized electromagnetic wave which is received by such an antenna may be forwarded to the transducer for separating the circularly polarized signal into a horizontal and a vertical component. However, it is understood that any other appropriate antenna for emitting and/or receiving circular polarized electromagnetic waves may be also possible. In particular, the antenna may be a feed antenna of a compact antenna test range (CATR) system. Especially, the antenna may further comprise a reflector such as a parabolic reflector or the like for directing the emitted/received signals.

In a possible embodiment, the antenna may be configured to receive a circular polarized measurement signal form the device under test and to provide the received measurement signal to the transducer. The transducer may be further configured to convert the circular polarized measurement signal to a first linear polarized measurement signal and to a second linear polarized measurement signal.

Accordingly, the transducer does not only combine the provided linear polarized in-band signal and the interference signal to a single circularly polarized test signal, but further the transducer also separates a received a circularly polarized measurement signal into a horizontal and a vertical component. The respective separated measurement signal may be forwarded to an analyzer. The analyzer may receive the linear polarized components of the measurement signal in order to process the signals. Accordingly, the analyzer may evaluate the signals. For this purpose, the analyzer may comprise a signal processor for processing the signal. In particular, the analyzer may comprise interfacing elements such as analogue to digital converters or the like.

In a possible embodiment, the test arrangement may comprise a measurement chamber that accommodates the antenna and the device under test.

Furthermore, the measurement chamber may also accommodate further elements, in particular the transducer or even the whole test system comprising the signal generator.

The measurement chamber may comprise a shielding or protective housing that isolates the test arrangement from any outside interference or disturbance during the measurements. It is understood that the measurement chamber may e.g. also comprise a door or sealable opening for accessing the insides of the measurement chamber, e.g. to place the device under test in the measurement chamber.

In a possible embodiment, the measurement chamber may comprise an anechoic chamber.

An anechoic chamber is a measurement chamber that is designed to completely absorb reflections of electromagnetic waves. The interior surfaces of the anechoic chamber may be covered with radiation absorbent material, RAM. RAM is designed and shaped to absorb incident RF radiation as effectively as possible. Measurements in electromagnetic compatibility and antenna radiation patterns require that signals arising from the test setup, like e.g. reflections, are negligible to avoid the risk of causing measurement errors and ambiguities.

With the anechoic chamber the quality of the measurements performed with the test arrangement may therefore be increased.

Especially for smaller devices like e.g. mobile phones or IoT devices, a small anechoic chamber may be sufficient to perform conformance tests because the radiating surface may be relatively small.

With the present invention it is therefore now possible to combine an in-band test signal for testing the device under test with an additional interference signal and to provide a combination of the in-band signal and the interference signal to a single, common signal. Accordingly, the single signal comprising the in-band component and the interference component can be provided to the device under test. Hence, only a single antenna for emitting both, the in-band signal and the interference signal is required. Thus, the size of the test arrangement and furthermore the costs for such a test the system can be reduced.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
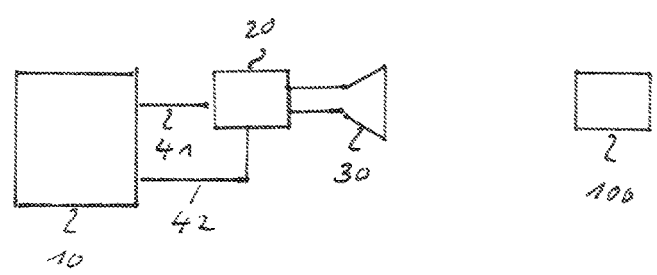
FIG. 1 shows a block diagram of an embodiment of a test arrangement according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of an embodiment of a test arrangement 1. The test arrangement 1 comprises a signal generator 10, a transducer 20 and an antenna 30. As can be further seen in FIG. 1, a first port of transducer 20 may be coupled with signal generator 10 by a first waveguide 41, and a second port of transducer 20 may be coupled with signal generator 10 by a second waveguide 42. In particular, the first waveguide 41 and the second waveguide 42 may be rectangular waveguides, i.e. waveguides having a rectangular cross-section. The rectangular cross-section of the first and the second waveguide 41, 42 may be adapted to the frequency of frequency range of the respective signals which are output by the signal generator 10.

A further port of the transducer 20 may be connected with antenna 30. For example, antenna 30 may be directly connected to the respective port of transducer 20. However, it is understood that any kind of appropriate connection, for example a waveguide or the like may be used for connecting antenna 30 with transducer 20.

Transducer 20 may be, for example, an orthomode transducer. Accordingly, an orthomode transducer comprises a first port related to a first linear polarization, a second port related to a second linear polarization, wherein the second polarization is orthogonal to the first polarization. Furthermore, the orthomode transducer may comprise a third port related to a circular polarization. The orthomode transducer may combine a linear signal received at the first port and a linear signal received at the second port to obtain the circular polarized signal. The circular polarized signal may be output at the further port.

Furthermore, the orthomode may also receive a circular polarized the signal at the further port and a separate the received circular polarized signal into two linear polarized signals, wherein the two linear polarized signals are orthogonal to each other. Hence, the orthomode transducer can operate in both directions, from the two linear polarized signal to a circular polarized signal or from a circular polarized signal to two orthogonal linear polarized signals.

Antenna 30 may be any kind of antenna which can emit or receive circular polarized signals. For example, antenna 30 may be a circular feedhorn or the like. However, it is understood, that any other appropriate antenna for emitting or receiving circular polarized signals may be also possible. In particular, antenna 30 may comprise a reflector or the like for adapting the direction of propagation of the emitted signals. For example, antenna 30 may comprise a compact antenna test range (CATR) or the like.

Antenna 30 may emit the circular polarized test signals in a direction towards device under test 100. Furthermore, antenna 30 may also receive circular polarized measurement signals from the device under test 100.

Signal generator 10 may generate an in-band signal for testing a device under test 100. For this purpose, any kind of appropriate signals for testing the device under test 100 may be possible. For example, signal generator 10 may generate signals having a predetermined frequency, a predetermined frequency range, test signals relating to a number of one or more predetermined channels, etc. In particular, the in-band signals may be signals in a range of GHz. However, it is understood, that the in-bed signals are not limited to the above-mentioned examples.

The in-band test signals may comprise signals relating to communication signals, control signals, or any other kind of signals. In particular, the test signals may comprise modulated signals, for example signals relating to a data sequence or the like.

The in-band signal may be a linear polarized signal. The in-band signals may be output by signal generator 10 and provided to a first port of transducer 20. For example, a first waveguide 41 may be used for connecting signal generator 10 and the first port of transducer 20. In particular, a waveguide having a rectangular cross-section may be used for connecting the signal generator 10 and the first port of the transducer 20. The size of the rectangular cross-section may be adapted to the frequency range of the in-band signal output by the signal generator.

Furthermore, signal generator 10 may generate an additional interference signal. The interference signal may be a linear polarized signal. The linear polarized interference signal may be provided to a second port of the transducer 20. Accordingly, the interference signal may be provided to the second input port of the transducer 20 by a second waveguide 42. Second waveguide 42 may be also a waveguide having a rectangular cross-section. In particular, the cross-section of the second waveguide 42 may be adapted to the frequency range of the interference signal provided by signal generator 10.

The interference signal may be any kind of the signal for causing interferences during the test procedure for testing the device under test 100. For this purpose, the frequency, the frequency range or a number of one or more frequency channels of the interference signal may be determined based on the frequency of the corresponding in-band signal. Furthermore, any other parameter of the interference signal may be also determined based on the properties of the in-band signal for testing the device under test 100.

In particular, the in-band signal or number of one or more parameters for the determining/specifying the in-band signal may be used for determining the parameters of the interference signal.

However, it is understood, that the parameters/properties of the interference signal may be also set independent of the in-band signal. For example, the interference signal may be generated based on predetermined parameters, for example based on a predetermined frequency, frequency range, a number of one or more predetermined channels etc. Furthermore, any other parameter of the interference signal, for example a phase, a modulation, an amplitude etc. may be also determined independent of the in-band signal or depending on the properties of the in-band signal.

Figure 2:
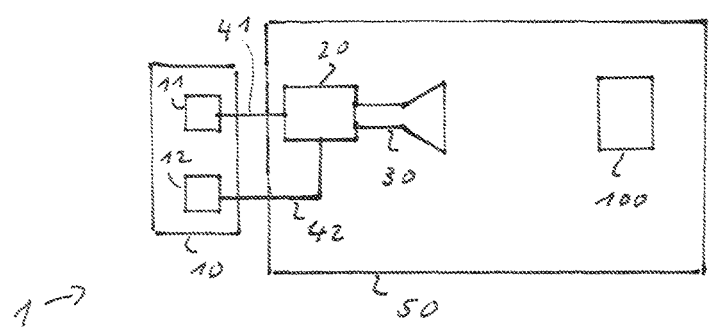
FIG. 2 shows a block diagram of another embodiment of a test arrangement according to the present invention.

FIG. 2 shows a block diagram of a further embodiment of a test equipment 1 for testing a device under test 100. The test equipment 1 according to FIG. 2 mainly corresponds to the test equipment 1 as described above in connection with FIG. 1. Thus, the respective description is omitted here.

Can be seen in FIG. 2, signal generator 10 may comprise a first signal source 11 for generating the in-band signal. Further, signal generator 10 may comprise a second signal software for generating the interference signal. Accordingly, several signal sources may be used for generating the in-signal and the interference signal. In this way, the in-band signal and the interference signal can be generated independent from each other. However, even by using two separate signal sources 11, 12 for generating the in-band signal and the interference signal, the interference signal may be generated by considering the in-band signal. For this purpose, the first signal source 11 and the second signals of the first may be communicatively coupled with each other. In this way, signal source 12 may take into account the properties of the in-band a signal when generating the interference signal.

Even though first signal source 11 and second signal source 12 are shown in a common signal generator 10. It may be also possible to generate in-band signal by the first signal source 11 and interference signal by the second signal source 12 based on signal sources which are arranged at a separate spatial location.

As already mentioned above, first signal source 11 and second signal source 12 generate a linear polarized signal, respectively. The two separate linear polarized signals are combined together to a circular polarized signals by transducer 20.

As further shown in FIG. 2, at least some of the components of test arrangement 1 may be arranged in a test chamber 50. For example, at least antenna 30 and device under test 100 may be arranged in the test chamber 50. However, it is understood, that although some or all of the further components of the test arrangement 1 may be also located inside test chamber 50.

For example, a test chamber 50 may be an anechoic test chamber. The anechoic chamber may be a measurement chamber that is designed to completely absorb reflections of electromagnetic waves. The interior surfaces of the anechoic chamber may be covered with radiation absorbent material, RAM.

For sake of clarity in the following description of the method based FIG. 3 the reference signs used above in the description of apparatus based FIGS. 1 and 2 will be maintained.

Figure 3:
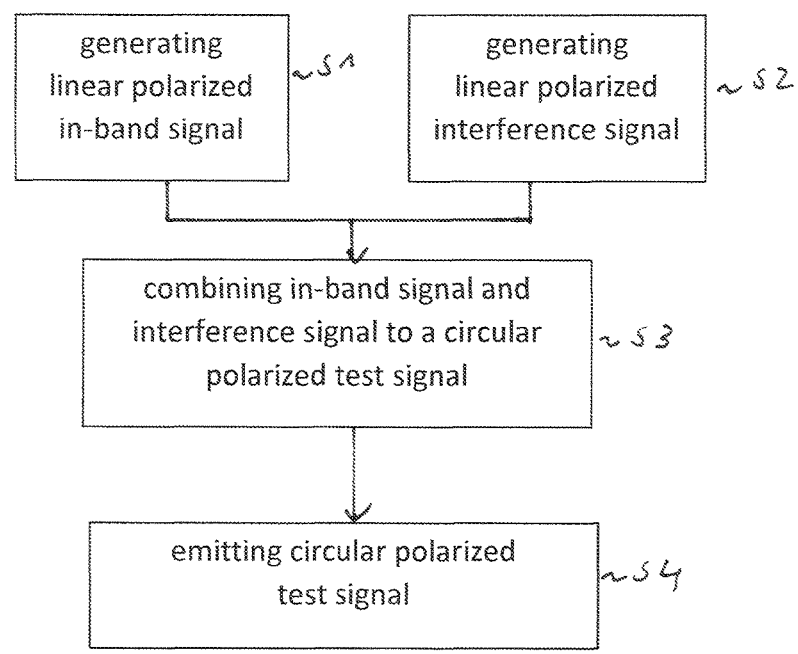
FIG. 3 shows a flow diagram of an embodiment of a test method according to the present invention.

FIG. 3 shows a flow diagram of a test method for wirelessly testing a device under test 100.

The test method comprises generating S1 a linear polarized in-band source signal by a signal generator 10, and generating S2 a linear polarized interference signal by the signal generator 10. The method further comprises combining S3 the linear polarized in-band source signal and the linear polarized interference signal by a transducer 20 to obtain a circular polarized test signal. Finally, the method comprises S4 emitting the circular polarized test signal to the device under test 100 by an antenna 30.

The transducer 20 may comprises an orthomode transducer having a first input port for receiving the linear polarized in-band source signal, a second input port for receiving the linear polarized interference signal and an output port for providing the circular polarized test signal.

The test method may comprise a first rectangular waveguide 41 for providing the linear polarized in-band source signal of the signal generator 10 to the transducer 20, and a second rectangular waveguide 42 for providing the interference signal of the signal generator 10 to the transducer 20.

In the test method, generating S1 a linear polarized in-band source signal may comprise generating a predetermined linear polarized in-band source signal by a first signal source 11 of the signal generator 10.

In the test method, generating S2 a linear polarized interference signal may comprise generating a predetermined a linear polarized interference signal by a second signal source 12 of the signal generator 10.

In the test method, the linear polarized interference signal may be generated by an intermodulated interference signal based on a signal provided by the second signal source 12.

The antenna 30 may comprise a circularly polarized horn antenna.

The test method may comprise receiving a circular polarized measurement signal form the device under test 100 by the antenna 30; providing the received measurement signal to the transducer 20; and converting the circular polarized measurement signal to a first linear polarized measurement signal and to a second linear polarized measurement signal by the transducer 20.

Summarizing, the present invention provides a test arrangement and method for wirelessly testing a device under test. An in-band test signal and a further interference signal are emitted to the device under test by a test arrangement comprising a single antenna. For this purpose, a linear polarized in-band test signal and a linear polarized interference signal are generated. The in-band test signal and the interference signal are combined by a transducer to a circular polarized signal and the circular polarized signal comprising the in-band test signal and interference signal is used for testing the device under test.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A test arrangement for testing a device under test, the test arrangement comprising:
   a signal generator for generating a linear polarized in-band source signal, and for generating a linear polarized interference signal;
   a transducer for receiving the linear polarized in-band source signal and the linear polarized interference signal, and for outputting a circular polarized test signal based on a combination of the linear polarized in-band source signal and the linear polarized interference signal; and
   an antenna for emitting the circular polarized test signal to the device under test.

2. The test arrangement of claim 1, wherein the transducer comprises an orthomode transducer having a first input port for receiving the linear polarized in-band source signal, a second input port for receiving the linear polarized interference signal and an output port for providing the circular polarized test signal.

3. The test arrangement of claim 1, comprising a first rectangular waveguide for providing the linear polarized in-band source signal of the signal generator to the transducer, and a second rectangular waveguide for providing the interference signal of the signal generator to the transducer.

4. The test arrangement of claim 1, wherein the signal generator comprises a first signal source for generating a predetermined in-band source signal.

5. The test arrangement of claim 1, wherein the test signal generator comprises a second signal source for generating a predetermined interference signal.

6. The test arrangement of claim 5, wherein the linear polarized interference signal is generated by an intermodulated interference signal based on a signal provided by the second signal source.

7. The test arrangement of claim 1, wherein antenna comprises a circularly polarized horn antenna.

8. The test arrangement of claim 1, wherein
the antenna is further configured to receive a circular polarized measurement signal form the device under test and to provide the received measurement signal to the transducer; and
the transducer is configured to convert the circular polarized measurement signal to a first linear polarized measurement signal and to a second linear polarized measurement signal.

9. The test arrangement of claim 1, comprising a measurement chamber that accommodates the antenna and the device under test.

10. The test arrangement of claim 9, wherein the measurement chamber comprises an anechoic chamber.

11. A test method for testing a device under test, the test method comprising:
generating a linear polarized in-band source signal by a signal generator,
generating a linear polarized interference signal by the signal generator;
combining the linear polarized in-band source signal and the linear polarized interference signal by a transducer to obtain a circular polarized test signal; and
emitting the circular polarized test signal to the device under test by an antenna.

12. The test method of claim 11, wherein the transducer comprises an orthomode transducer having a first input port for receiving the linear polarized in-band source signal, a second input port for receiving the linear polarized interference signal and an output port for providing the circular polarized test signal.

13. The test method of claim 11, comprising a first rectangular waveguide for providing the linear polarized in-band source signal of the signal generator to the transducer, and a second rectangular waveguide for providing the interference signal of the signal generator to the transducer.

14. The test method of claim 11, wherein generating a linear polarized in-band source signal comprises generating a predetermined linear polarized in-band source signal by a first signal source of the signal generator.

15. The test method of claim 11, wherein generating a linear polarized interference signal comprises generating a predetermined a linear polarized interference signal by a second signal source of the signal generator.

16. The test method of claim 15, wherein the linear polarized interference signal is generated by an intermodulated interference signal based on a signal provided by the second signal source.

17. The test method of claim 11, wherein antenna comprises a circularly polarized horn antenna.

18. The test method of claim 11, comprising:
receiving a circular polarized measurement signal form the device under test by the antenna;
providing the received measurement signal to the transducer; and
converting the circular polarized measurement signal to a first linear polarized measurement signal and to a second linear polarized measurement signal by the transducer.

19. The test method of claim 11, comprising a measurement chamber that accommodates the antenna and the device under test.

20. The test method of claim 19, wherein the measurement chamber comprises an anechoic chamber.

* * * * *